(12) United States Patent
Huang

(10) Patent No.: US 6,342,578 B1
(45) Date of Patent: Jan. 29, 2002

(54) COPOLYESTER WITH HIGH CARBOXYL END GROUPS AND A METHOD FOR MAKING

(75) Inventor: Xiaoyan Huang, Spartanburg, SC (US)

(73) Assignee: Arteva North America S.A.R.L., Zurich (CH)

( * ) Notice: Subject to any disclaimer, the term of this patent is extended or adjusted under 35 U.S.C. 154(b) by 0 days.

(21) Appl. No.: 09/731,414

(22) Filed: Dec. 6, 2000

(51) Int. Cl.[7] ............................................. C08G 64/00
(52) U.S. Cl. ....................................... 528/271; 528/272
(58) Field of Search ................................. 528/271, 272

(56) References Cited

U.S. PATENT DOCUMENTS

| | | | |
|---|---|---|---|
| 3,051,212 A | 8/1962 | Daniels | 152/330 |
| 4,016,142 A | 4/1977 | Alexander | 260/75 T |
| 4,238,593 A | 12/1980 | Duh | 528/272 |
| 4,361,681 A | 11/1982 | Bernhardt | 525/444 |
| 4,442,058 A | 4/1984 | Griffith | 264/176 R |
| 4,578,437 A | 3/1986 | Light | 525/444 |
| 5,362,844 A | 11/1994 | Kerpes | 528/308.5 |
| 5,473,161 A | 12/1995 | Nix | 250/343 |
| 5,912,307 A | 6/1999 | Paschke | 525/444 |
| 5,925,710 A | 7/1999 | Wu | 524/495 |
| 6,011,132 A | 1/2000 | Paschke | 528/272 |

FOREIGN PATENT DOCUMENTS

| | | |
|---|---|---|
| JP | 53-28649 | 3/1978 |
| WO | 00/49065 | 8/2000 |

*Primary Examiner*—Terressa M. Boykin
(74) *Attorney, Agent, or Firm*—Gregory N. Clements

(57) ABSTRACT

The present invention relates to a composition comprising: a copolyester of polyethylene terephthalate and a dicarboxylic acid or its ester equivalent, and not more than 100 microequivalents per gram of said copolyester of an anhydride selected from the class consisting of succinic, glutaric, benzoic, maleic and phthalic anhydride, said composition having a CEG content greater than about 25 microequivalents per gram and an IV greater than about 0.65. The present invention also concerns a method of making a composition having reduced caustic stress cracking, comprising: reacting terephthalic acid or its ester equivalent and another dicarboxylic acid with ethylene glycol by esterification followed by polycondensation to make a polyethylene terephthalate copolyester; adding at the end of said polycondensation not more than 100 microequivalents per gram based on said copolyester of an anhydride selected from the class consisting of succinic, glutaric, maleic, benzoic, and phthalic anhydride, said composition having a CEG content greater than about 25 microequivalents per gram.

14 Claims, No Drawings

COPOLYESTER WITH HIGH CARBOXYL END GROUPS AND A METHOD FOR MAKING

BACKGROUND OF THE INVENTION

1) Field of the Invention

The present invention concerns a copolyester resin having a high number of carboxyl end groups (CEG) and a method of making such a resin. Specifically, the copolyester is polyethylene terephthalate and a dicarboxylic acid, along with an anhydride resulting in a high content CEG resin characterized by reduced stress cracking. The copolyester is employed for a packaging resin useful in such as a soft drink beverage bottle, for example, with significantly improved stress cracking resistance. More particularly, the present invention also concerns a method of producing the copolyester by introducing at the end of polycondensation, one or more of phthalic anhydride, glutaric anhydride, benzoic anhydride, maleic anhydride or succinic anhydride in an amount sufficient to significantly reduce the caustic stress cracking.

2) Prior Art

Copolyester bottle resin is well known in the art. Typical copolyester bottle resins employ polyethylene terephthalate (PET) and a dicarboxylic acid such as isophthalic acid. The dicarboxylic acid was added to adjust the rate of crystallization of PET by decreasing it, in order to obtain clear bottle/jar preforms, which are stretch-blow molded into containers, such as soft drink bottles. If a crystallization retarding agent is not employed, crystallization of the preform occurs resulting in a hazy preform and a hazy bottle/jar. However, if too much dicarboxylic acid is used, the physical properties of copolyester resin are significantly weaker than PET resin.

Later, it was observed that an increase in isophthalic acid improved barrier properties of the bottle/jar of the copolyester resin. A balance in the amount of dicarboxylic acid employed was necessary to add a sufficient amount to adjust the rates of crystallization to avoid haze and improve the barrier properties, but avoid significantly weakening the copolyester (compared to PET resin).

It was then realized that the smaller (e.g. 20 ounce) soft drink beverage bottles, which have a larger volume/surface area ratio, require a higher barrier property than (2 liter) bottles. Thus the resin composition for smaller soft drink bottles contains more isophthalic acid to improve the barrier properties, than larger bottles.

The increase in isophthalic acid in copolyester resins has led to somewhat weaker physical properties especially for the smaller soft drink bottle. This weakening is observed in bottle failure from stress cracking, a problem not known before the significant increase in isophthalic acid. Stress cracking occurs over time, generally in the base of the bottle, causing a bottle under pressure with carbonated liquid to either lose pressure, or in the extreme, burst. Stress cracking can be initiated by the alkaline lubricants used in the bottle filling lines, or by the residues of alkaline cleaning solutions on store shelves.

U.S. Pat. No. 3,051,212 to Daniels; U.S Pat. No. 4,016,142 to Alexander et al.; and U.S. Pat. No. 4,442,058 to Griffith et al. teach reducing the amount of CEG present in polyester in order to increase the hydrolytic stability. More specifically, these references recognize that an increase in the CEG content for polyester, decreases the hydrolytic stability of the polymer, such that the IV stability during drying decreases, i.e., the IV drops during drying.

U.S. Pat. No. 4,328,593 to Duh discloses an amorphous polyester which has an optimal level of CEG to reduce the reaction time in a solid state polymerization vessel. Reducing the reaction time in a solid state polymerization (SSP) vessel minimizes chemical instability and deleterious polymerization byproducts. The optimum amount is defined as the amount of CEG content in the amorphous polymer necessary to react with some of the HEG (hydroxyl end groups) to favor the chemical reaction rate.

Although this reference teaches having an optimal amount of CEG during processing of the polymer, it teaches away from having an excess of CEG that remain in the resin, because such an excess would increase the SSP residence time (see FIG. 2 of the Duh reference). There is no disclosure that the polyester resin (of the preform or the blown bottle) contains a high CEG content. Polyester resin is polymer which has been solid state polymerized.

U.S. Pat. No. 4,361,681 to Bernhardt discloses PET having a reduced acetaldehyde generation rate. The PET is reacted with succinic or phthalic anhydride. The examples disclose that the anhydride was introduced by physically precoating the resin (which had been solid state polymerized) just prior to extrusion into bottle preforms. There is no disclosure relating to copolyesters or the CEG content.

U.S. Pat. No. 4,578,437 to Light et al. discloses copolyesters useful for bottle resin. Specifically, this reference discloses PET made from terephthalic acid and ethylene glycol with isophthalic acid to create the copolyester. This reference discloses its copolyesters have improved carbon dioxide barrier properties for soft drinks.

U.S. Pat. No. 5,362,844 to Kerpes et al. discloses an amorphous PET resin useful for making bottles, which has an optimum CEG content and after the PET has been SSP'd the resulting resin has a low acetaldehyde content. It is known that the CEG content in an amorphous polyester will be significantly reduced during solid state polymerization. There is no disclosure that the polyester resin, preform, or the bottle contains a high CEG content.

U.S. Pat. Nos. 5,912,307 and 6,011,132 to Paschke et al. discloses a copolyester of PET. naphthalate and/or isophthalate to increase the crystallinity of the copolyester article thereby exhibiting high carbon dioxide barrier properties.

U.S. Pat. No. 5,925,710 to Wu et al., teaches copolyesters having 2.5 weight percent of isophthalic acid. These copolyesters are useful for bottle resin. This reference discloses the amount of CEG in the amorphous resin, but does not disclose the amount of CEG in the preform or bottle (i.e., after solid state polymerization).

PCT published application WO 00/49065 to DuPont discloses a PET—isophthalic acid comonomer having a very high CEG content which was solid state polymerized for up to 24 hours. The IV never exceeded 0.639 because the HEG were essentially depleted, limiting further molecular weight enhancement. This reference also teaches that low CEG content is better for producing high IV's (see Examples 2 and 5).

To increase the SSP rate, an optimum amount of CEG in the amorphous polymer is desired as taught by the Duh patent. At the end of SSP, it is no longer desired to have free CEG within the resin and Duh states that excess CEG increase, not decrease, the SSP reaction time. It is also known that an excess of CEG in the resin has a detrimental hydrolytic stability effect (as taught by Daniels, Alexander, et al. or Griffith et al.) thus weakening and lowering its IV and producing a product having lower physical properties, compared with the physical properties obtained from a product having a higher IV. None of the references set forth above discloses stress cracking as a problem and therefore none of the references has a solution for reducing or preventing stress cracking.

It is a chief aim and object of the present invention to provide a copolyester capable of being stretch-blow molded into a bottle or jar container which exhibits improved stress cracking resistance over conventionally available polyester or copolyester resin compositions.

Likewise, it is another object of the present invention to manufacture a copolyester resin capable of being stretch-blow molded into bottles or jar containers, by making the copolyester with a high CEG content after SSP.

SUMMARY OF THE INVENTION

The resin of the present invention, directed to a copolyester of PET and at least one dicarboxylic acids such as, for example, isophthalic acid or naphthoic acid has reduced stress cracking i.e. improved stress cracking performance when small amounts of phthalic, glutaric, benzoic, maleic and/or succinic anhydride are incorporated into the copolyester. The anhydride reacts with the HEG in the copolyester to produce CEG. It is believed that these higher CEG resins neutralize the alkaline lubricants that contact the base of the bottle. Therefore, the incorporation of anhydride into the resin to convert some of the HEG to CEG drastically reduces the stress cracking occurring in soft drink bottles, for example. The stress cracking is exemplified when a bottle bursts, discharging its contents.

In the broadest sense, the present invention refers to a copolyester composition consisting of PET and dicarboxylic acid such as isophthalic acid or naphthoic acid, which has been solid stated, and wherein the copolyester contains up to 20 wt % of the dicarboxylic acid and has a CEG content greater than 25 microequivalents per gram. Solid state resin means a resin having an IV greater than about 0.65. More preferably, the copolyester compositions of the present invention have an IV greater than about 0.70. Most preferably, the copolyester compositions of the present invention have an IV greater than about 0.75. The broad scope of the present invention contemplates a CEG value of 25 microequivalents per gram, a preferred range is 30 microequivalents per gram, and a most preferred range is 40 microequivalents per gram.

In the broadest sense, the present invention also comprises a method of manufacturing a resin composition having improved (reduced) stress cracking by producing a copolymer of PET and dicarboxylic acid such as isophthalic acid or naphthoic acid, and adding at least one of phthalic anhydride, glutaric anhydride, benzoic anhydride, maleic anhydride or succinic anhydride as a late addition in the melt polymerization process, and solid state polymerizing the composition.

DESCRIPTION OF THE PREFERRED EMBODIMENTS

Polyethylene terephthalate (PET) is conventionally made by reacting either dimethyl terephthalate or terephthalic acid with ethylene glycol, for example, via an esterification reaction, followed by a polycondensation reaction. When making PET, either in a batch or continuous process, the reactions can be driven to near completion, yielding PET having up to 3 weight percent of diethylene glycol and other byproducts. Pet is meant to include small amounts of byproducts.

Conventional continuous production of PET is well known in the art and comprises reacting terephthalic acid and ethylene glycol at a temperature of approximately 200° to 250° C. forming monomer and water. Because the reaction is reversible, the water is continuously removed, driving the reaction to the production of monomers. Next the monomers undergo polycondensation reaction in vacuum conditions at a temperature of approximately 250° to 290° C. to form polymer having an IV of about 0.4 to 0.6. During the esterification reaction, no catalyst is needed. However, in the polycondensation reaction, a catalyst such as antimony or titanium is necessary.

PET is also made in batch and continuous processes from the reaction of the ester-dimethyl terephthalate and ethylene glycol, at a reaction temperature of approximately 190° to 230° C. forming alcohol (methanol) and monomer. This esterification reaction is reversible and the alcohol must be continuously removed, driving the reaction to the production of monomer. In the reaction of dimethyl terephthalate and ethylene glycol, catalysts such as manganese, zinc, cobalt or other conventional catalyst are employed. Next, the monomer undergoes a polycondensation reaction at the conditions stated above to form a polymer having an IV of about 0.4 to 0.6. Making a copolyester with PET and dicarboxylic acid (to reduce the crystallization rate and improve its barrier properties) merely requires the substitution of the acid or its ester equivalent, for example, to also undergo an esterification (either in a continuous or a batch process) followed by a polycondensation reaction, simultaneously with the making of PET.

Resins containing up to 20 wt % of the dicarboxylic acid are useful in forming bottles or jar containers as is known in the art. Suitable diacids may be aliphatic, alicyclic, or aromatic dicarboxylic acids such as isophthalic acid, 1,4-cyclohexanedicarboxylic acid; 1,3-cyclohexanedicarboxylic acid, succinic acid, glutaric acid, adipic acid, sebacic acid, 1,12-dodecanedioic acid; 2,6-naphthalenedicarboxylic acid, bibenzoic acid, oxalic acid, malonic acid. pimelic acid, suberic acid, azalaic acid, maleic acid, fumaric acid, phthalic acid, hemimellitic acid, trimellitic acid, trimesic acid, or mixtures of these and their equivalents. It is often preferred to use a functional acid derivative equivalent such as dimethyl, diethyl, or dipropyl ester of the dicarboxylic acid.

Bottle resin, including the present invention, typically contains 1.5–20 wt. %, based on the weight of the resin, of isophthalic acid as the crystallization retarder and barrier improvement additive.

In the making of bottle preforms and plastic bottles from the preforms, it is often desired to produce the cleanest, clearest polymer. Accordingly, the less additives employed, the clearer the polymer produced. On the other hand, it is sometimes desirable to make a colored plastic bottle or bottles with other desired characteristics, and thus the use of a variety of conventionally known additives is also within the scope of the present invention. Accordingly, various pigments, dyes, fillers, branching agents, and other typical agents may be added to the polymer generally during or near the end of the polycondensation reaction. The exact desired additives and the place on introduction in the reaction does not form a part of this invention and this technology is well known in the art. Any conventional system may be employed and those skilled in the art can pick and choose among the various systems of introduction of additives to achieve the desired result.

Typical additives to increase the CEG level of the copolyester are phthalic, glutaric, benzoic, maleic and/or succinic anhydride. The ester and acid equivalents of these anhydrides are not desirable because a catalyst would be necessary for these to react with the resin. For example, if dimethyl phthalate was employed, it would not react with the copolyester resin at the end of polycondensation without the presence of a catalyst. Using the anhydrides to increase CEG eliminates the need for any catalyst. An additional advantage of using anhydrides is that no byproducts are generated by their reaction with HEG. Reaction of esters would generate alcohols and reaction of diacids would generate water. The presence of these materials would have a deleterious effect on resin quality. The amount of anhydride typically employed in the present invention ranges from about 10–100 microequivalents, and preferably 20 to 50 microequivalents per gram of the copolyester.

With the process of the present invention, it is not desirable to add the anhydride agents to the reaction vessel in such a manner that the anhydride reacts with all of the HEG in the polyester and no HEG are available for polymerization, i.e., adding excessive anhydride during esterification. For polymerization to occur either in the polycondensation reactor or in the SSP reactor, or both, one of two reactions must occur, namely:

(1)

and

(2)

The first reaction is a slower reaction but water is easily separated from the reaction vessel. The second reaction is faster but the glycol is harder to separate from the reactor. From these two equations, it is easy to see that if the anhydride reacts with all of the hydroxyls in the copolyester, there will be no more OH groups (bydroxyl end groups) available for polymerization. Accordingly, the reaction will stop.

In order to obtain a resin having an abundance of carboxyl end groups, it is clear that the anhydrides of the present invention must be added at the end of polycondensation or later. With the present invention, it is preferred that anhydride is introduced late in the melt polymerization process such as late in the polycondensation process just prior to solid state polymerization. Specifically, the anhydride could be added near the end of the polycondensation polymerization process such that it has at least one to two minutes reaction time before the copolymer is extruded, cooled and cut into chip.

If a batch process is used, there are two reactor vessels, one for esterification, which is generally at atmospheric pressure and at a temperature of from about 180° to 250° C. Then the esterified reaction products are transferred to a polycondensation vessel, which is operated at a higher temperature, generally between 250° to 290° C. and at a vacuum. Accordingly, the anhydride of the present invention would be added to copolyester resin at the end of polycondensation reaction, just after the vacuum is permitted to attain atmospheric pressure, such that it reacts with the copolymer for at least one to two minutes before it is extruded, cooled and cut into chip.

If a continuous process is used, anhydride is added to the transfer pipe between the final polymerizer and the die that forms the strands that are cooled and cut into chips. Anhydride added at this point has a mixing time of about one to two minutes (the residence time) in the piping as it flows from the high polymerizer vessel to the die where it is extruded, then cooled and cut into chip. The amount of anhydride incorporated at this point in the process can be controlled to give an optimum CEG/HEG ratio sufficient for solid state polymerization, i.e., some residual HEG, as well as an increased CEG level in the final polyester resin. Typically, 10–100 microequivalents of the anhydride is employed per gram of the resin. Preferably, 20–50 microequivalents of anhydride is used per gram of the copolyester resin.

After polycondensation, the copolyester is extruded, cooled and cut into chip as conventionally known in the art. The chip is ready for SSP, where the chip IV is generally increased from about 0.4–0.6 to 0.65–0.90. For a 0.6 I.V., a total of about 110 end groups are present. There are about 80 HEG (microequivalents per gram) and about 30 CEG (microequivalents per gram) present from a typical melt phase polymerization. With the addition of 30 to 40 microequivalents per gram of succinic anhydride corresponding to about 0.3 to 0.4 weight per gram, such additive would convert 30 to 40 HEG to CEG yielding 60 to 70 CEG with the same total of 110 end groups in the amorphous resin prior to SSP. The SSP reaction to an IV of 0.80 reduces the total end groups to about 75, with 45 to 55 being CEG and 20 to 30 being HEG.

VARIOUS TESTING PROCEDURES

CEG

The CEG value of a polymer is determined by dissolving a sample of the polymer in reagent grade benzyl alcohol and titrating to the purple end point of phenol red indicator with 0.03 N sodium hydroxide/benzyl alcohol solution. The results are reported in microequivalents sodium hydroxide per gram of the sample.

DEG

The DEG (diethylene glycol) content of the polymer is determined by hydrolyzing the polymer with an aqueous solution of ammonium hydroxide in a sealed reaction vessel at 220±5° C. for approximately two hours. The liquid portion of the hydrolyzed product is then analyzed by gas chromatography. The gas chromatography apparatus is a FID Detector (HP5890, HP7673A) from Hewlett Packard. The ammonium hydroxide is 28 to 30% by weight ammonium hydroxide from Fisher Scientific and is reagent grade.

IV

Intrinsic viscosity (IV) is determined by mixing 0.2 grams of an amorphous polymer composition with twenty milliliters of dichloroacetic acid at a temperature of 25° C. using a Ubbelhode viscometer to determine the relative viscosity (RV). RV is converted to IV using the ISO certificated equation: IV=[(RV−1)×0.6907]+0.63096

Stress Cracking

The resistance of a bottle to stress cracking is determined at an accelerated test using sodium hydroxide to induce stress cracking. Twenty-five bottles are used as a set. The bottles are filled with water at 22° C. to a target net contents (2 liter bottles would contain 2 liters of water). Each bottle is pressurized with compressed air to an equivalent internal pressure of 531 kPa (77 psi). Five minutes after pressurization, each bottle is placed in individual pockets containing a 0.2 percent sodium hydroxide solution at 22° C. The solution covers the base of the bottle up to the top of the strap of the bottle. The time for failure of each bottle is recorded. Failure is defined as a burst or slow leak as evidenced by a drop in the level of water in the bottle. The test is completed after four hours. Results are reported as the number of failures in a four hour period, and as the average time for thus said to fail.

Haze

The haze of the preforms was measured with a Hunter Lab ColorQuest II instrument. The haze is defined as the percent of diffused light to total transmitted light.

PREFORM AND BOTTLE PRODUCTION

After solid state polymerization, the resin of the present invention is typically heated and extruded into preforms. Each preform for a 20 ounce soft drink bottle, for example, employs about 26.8 grams of the resin. The preform is then heated to about 100–120° C. and blown-molded into a 20 ounce contour bottle at a stretch ratio of about 12.5. The stretch ratio is the stretch in the radial direction times the stretch in the length (axial) direction. Thus if a preform is blown into a bottle, it may be stretched about two times its length and stretched about six times is diameter giving a stretch ratio of twelve (2×6). Since the bottle size is fixed, different preform sizes can be used for obtaining different stretch ratios. The preforms tested in the examples for the 20 ounce contour bottles have from 5.0 to 5.4 grams of resin in the base. More specifically, the weight of the bottle base was primarily from 5.2 to 5.3 grams. Most stress cracking occurs in the base of the bottle. Testing for stress cracking should be completed with bottles having a base of about the same thickness (i.e., the same amount of resin) to give comparable results.

EXAMPLE 1

A copolyester of PET and 2% by weight (based on weight of copolyester) isophthalic acid was formed using terephthalic acid, isophthalic acid and ethylene glycol in a continuous process with about 200 ppm antimony catalyst and about 10 ppm phosphorus (added as polyphosphoric acid). The diethylene glycol (DEG) level of the copolyester was about 1.5 weight percent. Succinic anhydride was melt metered into the molten copolymer after the last polymerizer before extrusion and pelletization giving a residence time of about one minute. The amounts of succinic anhydride are set forth in Table 1. During this time the anhydride reacted with the HEG in the copolyester and formed CEG. The amorphous resins were then solid state polymerized, extruded into preforms and blown into bottles. The results are set forth in Table 1.

TABLE 1

| Run | Succinic Anhydride wt % | Succinic Anhydride µequiv/g | Amor. IV | Amor. CEG. µequiv/g | SSP Rate (IV rise/hr) | SSP IV | SSP-CEG µequiv/g | % Fail 4 hour | Avg. Failure Time min. |
|---|---|---|---|---|---|---|---|---|---|
| 1 | 0 | 0 | 0.567 | 20 | 0.0114 | 0.823 | 11 | 100 | 165 |
| 2 | 0.3 | 30 | 0.549 | 54 | 0.0194 | 0.855 | 27 | 52 | 232 |
| 3 | 0.4 | 40 | 0.558 | 72 | 0.0196 | 0.851 | 39 | 12 | 236 |

The increase in preform haze of runs 2 and 3 compared to the control (run 1) was 0.1 and 0.4% respectively.

EXAMPLE 2

A copolyester of PET containing 3 weight percent based on the weight of copolyester of isophthalate was prepared in a batch DMT process. Isophthalic acid was added after ester exchange using 80 ppm Mn manganese catalyst and 50 ppm phosphorus as a sequestering agent. The monomer was polymerized using about 200 ppm antimony catalyst. Various amounts of succinic anhydride were added at the end of polymerization by releasing the vacuum, adding and mixing under a nitrogen atmosphere for four minutes prior to extrusion and pelletization. The DEG level of the copolyesters were about one weight percent. The results are set forth below.

TABLE 2

| Run | Succinic Anhydride wt % | Succinic Anhydride μequiv/g | Amor. IV | Amor. CEG. μequiv/g | SSP Rate (IV rise/hr) | SSP IV | SSP-CEG μequiv/g | % Fail 4 hour | Avg. Failure Time min. |
|---|---|---|---|---|---|---|---|---|---|
| 1 | 0 | 0 | 0.640 | 30 | 0.0151 | 0.827 | 22 | 100 | 171 |
| 2 | 0.3 | 30 | 0.608 | 61 | 0.0088 | 0.824 | 48 | 48 | 225 |
| 3 | 0.4 | 40 | 0.598 | 69 | 0.0042 | 0.800 | 54 | 32 | 227 |

EXAMPLE 3

A copolyester of PET was prepared containing 8.6 weight percent isophthalate based on weight of coplyester was prepared as in Example 2. The DEG content of the copolyesters was about 0.8 weight %. The data for these tests is set forth in Table 3.

These amorphous copolyesters were dried and compression molded at 265° C. for 5 min. at 20,000 psi to remove air bubbles while forming thin films. The oxygen permeability (cc cm/m$^2$/atm day) of these films were calculated from measurements of the steady state flux with a MOCON OX-TRANO 2/20 instrument using Fick's law. The oxygen flux was measured at 25°, 0% relative humidity, and at 1

TABLE 3

| Run | Succinic Anhydride wt % | Succinic Anhydride μequiv/g | Amor. IV | Amor. CEG. μequiv/g | SSP Rate (IV rise/hr) | SSP IV | SSP-CEG μequiv/g | % Fail 4 hour | Avg. Failure Time min. |
|---|---|---|---|---|---|---|---|---|---|
| 1 | 0 | 0 | 0.67 | 27 | 0.0143 | 0.84 | 21 | 100 | 121 |
| 2 | 0.35 | 35 | 0.56 | 60 | 0.0057 | 0.85 | 41 | 97 | 188 |

EXAMPLE 4

A series of copolymers were prepared according to Example 2, but using different anhydrides. The DEG level of the copolyesters was about 1.2 to 1.5 weight %. The results are shown in Table 4.

atmospheric pressure. The samples were conditioned with nitrogen for 24 hours to remove all oxygen before measuring the flux.

The oxygen permeability of these polyesters are given in Table 5, showing that phthalate esters are more effective, at

TABLE 4

| Anhydride | Wt % | μequiv./g | Amor. IV | Amor. CEG μequiv./g | SSP Rate (IV rise/hour) | SSP IV | SSP-CEG μequiv./g |
|---|---|---|---|---|---|---|---|
| None | — | — | 0.64 | 21 | 0.015 | 0.84 | 18 |
| Phthalic | 0.4 | 26 | 0.64 | 47 | 0.014 | 0.81 | 26 |
| Phthalic | 0.5 | 33 | 0.60 | 31 | 0.015 | 0.82 | 20 |
| Glutaric | 0.2 | 17 | 0.61 | 37 | 0.011 | 0.87 | 23 |
| Glutaric | 0.4 | 35 | 0.62 | 58 | 0.011 | 0.84 | 42 |

This Example shows the use of different anhydrides for increasing the CEG content of the copolyester resin.

Comparative Example 5

A series of copolymers containing either phthalic or isophthalic acid were prepared by a batch DMT process. Either dimethyl phthalate or dimethyl isophthalate was reacted with ethylene glycol and esterified with manganese acetate (82 ppm Mn) and antimony trioxide (314 ppm Sb) at a temperature range of about 180–220° C. with methanol removal. After the addition of polyphosphoric acid (82 ppm P) the esterified product was polymerized in a vacuum (ultimately 0.3 Torr) at a temperature of 285° C. to an IV of 0.60 to 0.64.

the same mole %, in barrier properties than isophthalate copolyesters. One skilled in the art would not be led to modify a PET/ anhydride copolymer by the addition of isophthalic acid to improve barrier properties. Moreover, phthalic anhydride also decreases the rate of crystallization of PET, such that one skilled in the art would not be led to modify a PET and anhydride copolymer by the addition of isophthalic acid for crystallization improvements.

TABLE 5

| Dicarboxylic ester | Mole % | Oxygen Permeability |
|---|---|---|
| None | — | 0.434 |
| Isophthalic | 5 | 0.430 |
| Phthalic | 5 | 0.392 |

TABLE 5-continued

| Dicarboxylic ester | Mole % | Oxygen Permeability |
|---|---|---|
| Isophthalic | 10 | 0.393 |
| Phthalic | 10 | 0.362 |

Comparative Example 6

Siccinic anhydride was powder coated onto a commercial PET resin (KoSa 3301, 0.75 IV) at various levels, and preforms made in the normal manner. The haze of the preforms was measured and the results are set forth in Table 6.

TABLE 6

| | Succinic Anhydride | | |
|---|---|---|---|
| Run | Weight % | Microequiv./g | Increase in Preform Haze, % |
| 1 | 0 | 0 | 0 |
| 2 | 0.2 | 20 | 4.4 |
| 3 | 0.4 | 40 | 6.6 |
| 4 | 1.0 | 100 | 7.2 |
| 5 | 2.0 | 200 | 12.7 |

The desire of any bottle or jar manufacturer is to be able to produce a crystal clear bottle of jar. If an anhydride is powder coated on the resin, such as disclosed by Bernhardt, the result is a verry hazy bottle. The unreacted particles of succinic anhydride cause the bottle to appear hazy. This is undesirable. The method of the present invention wherein the anhydride is injected into the copolyester near the very end of polycondensation provides sufficient time for the anhydride to react with the copolyester such that no particles are present. Bottle haze employing the method of the present invention is a significant improvement (see Example 1) over the process disclosed by the Bernhardt reference as seen from Table 6.

Thus it appears that there has been provided, in accordance with the invention, a copolyester resin and a method of making the copolyester resin that fully satisfies the objects, aims, and advantages set forth above. While the invention has been described in conjunction with specific embodiments thereof, it is evident that many alternatives, modifications, and variations would be apparent to those skilled in the art in light of the foregoing description. Accordingly, it is intended to embrace all such alternatives, modifications, and variations as fall within the spirit and scope of the invention.

What is claimed is:

1. A composition comprising: a copolyester of polyethylene terephthalate and a dicarboxylic acid or its ester equivalent, and not more than 100 microequivalents per gram of said copolyester of an anhydride selected from the class consisting of succinic, glutaric, benzoic, maleic and phthalic anhydride, said composition having a CEG content greater than about 25 microequivalents per gram and an IV greater than about 0.65.

2. The composition of claim 1, wherein said polyethylene terephthalate comprises about 80 to 98.5 wt. % and said dicarboxylic acid comprises about 1.5 to 20 wt. %, based on the total weight of said copolyester.

3. The composition of claim 1, wherein said dicarboxylic acid is selected from the class of oxalic, malonic, succinic, glutaric, adipic, pimelic, suberic, azelaic, sebacic, maleic, fumaric, phthalic, isophthalic, hemimellitic, trimellitic, 1,4-cyclohexanedicarboxylic, 1,3-cyclohexanedicarboxylic, succinic, 1,12-dodecanedioic, 2,6-naphthalenedicarboxylic, bibenzoic, and trimesic.

4. The composition of claim 1, wherein said anhydride is present from about 10 to about 100 microequivalents per gram.

5. The composition of claim 1, wherein said copolyester may include up to 3 wt. % by-products and other additives.

6. The composition of claim 1, wherein said CEG content is greater than about 30 microequivalents per gram and the IV is greater than about 0.70.

7. A preform comprising: a preform made from a copolyester of polyethylene terephthalate and a dicarboxylic acid or its ester equivalent, and not more than 100 microequivalents per gram of said preform copolyester of an anhydride selected from the class consisting of succinic, glutaric, benzoic, maleic and phthalic anhydride, said preform having a CEG content greater than about 25 microequivalents per gram, and an IV greater than about 0.65.

8. A bottle comprising: a bottle made from a copolyester of polyethylene terephthalate and a dicarboxylic acid or its ester equivalent, and not more than 100 microequivalents per gram of said copolyester of an anhydride selected from the class consisting of succinic, glutaric, benzoic, maleic and phthalic anhydride, said bottle having a CEG content greater than about 25 microequivalents per gram, and an IV greater than about 0.65.

9. A method of making a composition having reduced caustic stress cracking, comprising: reacting terephthalic acid or its ester equivalent and another dicarboxylic acid with ethylene glycol by esterification followed by polycondensation to make a polyethylene terephthalate copolyester;

adding at the end of said polycondensation not more than 100 microequivalents per gram based on said copolyester of an anhydride selected from the class consisting of succinic, glutaric, maleic, benzoic, and phthalic anhydride, said composition having a CEG content greater than about 25 microequivalents per gram.

10. The method of claim 9, wherein said polyethylene terephthalate comprises about 80 to 98.5 wt. % and said dicarboxylic acid comprises about 1.5 to 20 wt. %, based on the total weight of said copolyester.

11. The method of claim 9, wherein said dicarboxylic acid is selected from the class of oxalic, malonic, succinic, glutaric, adipic, pimelic, suberic, azelaic, sebacic, maleic, fumaric, phthalic, isophthalic, hemimellitic, trimellitic, 1,4-cyclohexanedicarboxylic, 1,3-cyclohexanedicarboxylic, succinic, 1,12-dodecanedioic, 2,6-naphthalenedicarboxylic, bibenzoic, and trimesic.

12. The method of claim 9, wherein said anhydride is present from about 10–100 microequivalents per gram.

13. The method of claim 9, wherein said copolyester may include up to 3 weight % by-products and other additives.

14. The method of claim 9, wherein said composition is solid state polymerized to an IV of at least 0.65.

* * * * *